(12) United States Patent
Cooper et al.

(10) Patent No.: US 7,802,185 B1
(45) Date of Patent: Sep. 21, 2010

(54) SYSTEM AND METHOD FOR PRODUCING DOCUMENTS IN A PAGE DESCRIPTION LANGUAGE IN RESPONSE TO A REQUEST MADE TO A SERVER

(75) Inventors: Damon F Cooper, Framingham, MA (US); Xu Chen, San Mateo, CA (US); Sherman Gong, Burlington, MA (US); Michael Nimer, South Boston, MA (US)

(73) Assignee: Adobe Systems Incorporated, San Jose, CA (US)

( * ) Notice: Subject to any disclaimer, the term of this patent is extended or adjusted under 35 U.S.C. 154(b) by 1157 days.

(21) Appl. No.: 11/282,288

(22) Filed: Nov. 18, 2005

Related U.S. Application Data

(60) Provisional application No. 60/629,512, filed on Nov. 18, 2004.

(51) Int. Cl.
*G06F 17/00* (2006.01)
(52) U.S. Cl. .................. 715/276; 715/249; 715/239
(58) Field of Classification Search .................. 715/234, 715/236, 249, 276
See application file for complete search history.

(56) References Cited

OTHER PUBLICATIONS

Sangal, Puneet, "Publishing XML Documents in PDF and HTML with Cocoon" Aug. 5, 2004 http://www.devx.com/opensource/Article/21670/.*
"XSP Processor, Introduction" © 1999-2001 The Apache Software Foundation http://cocoon.apache.org/1.x/xsp.html.*
Darwin, Ian, Java Cookbook, Jun. 2001, Chapter 18 http://oreilly.com/catalog/javacook/chapter/ch18.html.*
Tidwell, Doug, HTML to Formatting Objects (FO) Conversion guide, Feb. 1, 2003, IBM DeveloperWorks, http://www.ibm.com/developerworks/library/x-xslfo2app/.*
Bergman, Noel J. Introduction to JavaServer Pages, Aug. 28, 2001 https://www6.software.ibm.com/developerworks/education/j-introjsp/j-introjsp-pdf.pdf.*
"Displaying XML with XSL" Archived Apr. 10, 2003 www.w3schools.com/XML/xml_xsl.asp?output=print.*
Moss, William F., "Mathematics in WebCT", Jun. 10, 1999 http://www.math.clemson.edu/~bmoss/math_on_web/math.htm.*
"Modular Programming", MIT Course 16.070 Lecture #5 Handout, Feb. 16, 2001 http://web.mit.edu/16.070/www/year2001/Modular_Programming.pdf.*
Adobe Systems Incorporated, "What is Adobe PDF?", downloaded from the internet on Apr. 16, 2007 at http://web.archive.org/web/20051107011230/http://www.adobe.com/products/acrobat/adobepdf.html, Jan. 2005. 1 page.
Forta, et al. "ColdFusion MX Web Application Construction Kit", Fifth Edition, Macromedia Press, ISBN 0-321-12516-9, 2003.
Lowagie, et al. "iText Homepage", downloaded from the internet on Apr. 16, 2007 at http://web.archive.org/web/20051025040053/www.lowagie.com/iText, Oct. 20, 2005, 1 page.
Macromedia, Inc. "Macromedia Flash File Format (SWF) Specification License", downloaded from the internet on Apr. 18, 2007 at http://web.archive.org/web/20051218033147/www.macromedia.com/licensing/developer, 2005, 2 pages.

* cited by examiner

*Primary Examiner*—Adam M Queler
(74) *Attorney, Agent, or Firm*—Fish & Richardson P.C.

(57) ABSTRACT

A system and computer program product produces an output document in any of several formats including any of several page description languages, from a file, in response to server side code.

14 Claims, 3 Drawing Sheets

SYSTEM AND METHOD FOR PRODUCING DOCUMENTS IN A PAGE DESCRIPTION LANGUAGE IN RESPONSE TO A REQUEST MADE TO A SERVER

RELATED APPLICATION

This application claims priority from U.S. Provisional Patent Application Ser. No. 60/629,512 Entitled, "Method and Apparatus for Producing Documents in a Page Description Language in Response to a Request Made to a Server, filed on Nov. 18, 2004 by Damon Cooper, Xu Chen, Sherman Gong and Michael Nimer, having the same assignee as the present application, and is hereby incorporated by reference in its entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is related to computer software and more specifically to web server computer software.

BACKGROUND OF THE INVENTION

Authors currently have to make a choice when it comes to providing documents to their users over the Internet. If the author uses a page description language like Adobe Acrobat commercially available from Adobe, Inc., of San Jose Calif., the author can achieve a high degree of precision when it comes to printing documents: the document will print exactly as the author intended. Furthermore, printing an Adobe Acrobat document is easy for the user, performed with a single print command.

However, Acrobat has a low degree of interactivity, certain dynamically generated content isn't supported at all, and customization of the output for the user is difficult. Thousands of man hours of existing investment in HTML pages can be lost when converting to another file format, making many authors reluctant to switch formats. Furthermore, Acrobat takes a while to load itself into the user's browser, and the user is sometimes requested to upgrade the product, which takes additional time. The time required to view such a document using Adobe Acrobat can cause a user to become frustrated with the process and give up.

Acrobat isn't the only output format that has the advantages described above. Other file formats, such as the conventional FlashPaper file format allows users to use the conventional Flash Player available from Macromedia, Inc. of San Francisco Calif. to view documents. It loads much faster than Acrobat and suffers from few of its other drawbacks. However, committing to any file format different from the HTML format that many authors currently use, FlashPaper, Acrobat or any other format, can entail effort and risks that many parties are unwilling to take.

The alternative to providing documents in a page description language to users over the Internet is to continue to use HTML-based web pages as documents. HTML based documents allow the author to include interactivity (e.g. drilling down on a report) and, using technologies like ColdFusion, a web page can be precisely tailored for a user or for circumstances that exist at the time the document is requested. Existing investments in HTML can be utilized when an author continues to use HTML as the file format of documents sent to users. HTML documents are generally available to the user without the overhead of loading Acrobat, and video or other formats is only a click away.

However, printing web based documents may not produce the precise output intended by the author. For example, the right edge of a document may be cut off or printed on separate pages. Furthermore, the user interface for printing web pages is inconvenient. For example, printing web-based content can require the user to perform a number of print commands, one for each page. However, there is already so much content available in the form of HTML documents, that it would be desirable to allow an HTML source for any output document produced.

As a result of the advantages and disadvantages of each type of output, authors of web based documents are required to compromise on the type of output produced, and neither provides a truly satisfactory result.

What is needed is a system and method that can provide interactive, customizable content, but prints precisely as the author intended using an easier-to-use user interface than printing HTML documents a page at a time, does not require the discarding of all of an author's existing investment in HTML, and does not require an author to commit to a single new file format.

SUMMARY OF INVENTION

A system and method accepts a request from a web server, retrieves and optionally builds customizable content, and then converts an HTML source that optionally includes additional server side code into an output document in any one of several page description languages, or supplies the document as HTML, all under control of the server side code.

DETAILED DESCRIPTION OF A PREFERRED EMBODIMENT

Figure 1:
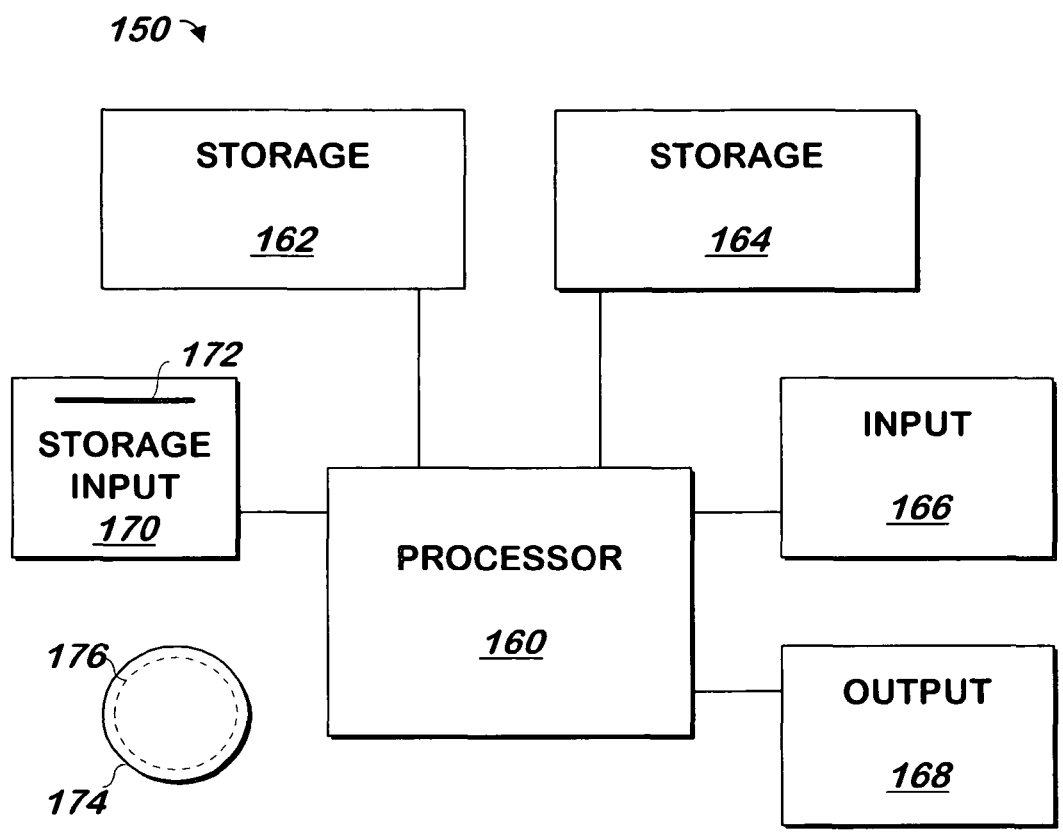
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, California and the NETSCAPE browser commercially available from NETSCAPE COMMUNICATIONS CORPORATION of Mountain View, Calif. or INTERNET EXPLORER browser commercially available from MICROSOFT above, although other systems may be used.

Receipt and Forwarding of Information from the Request Made to the Web Server.

Figure 2:
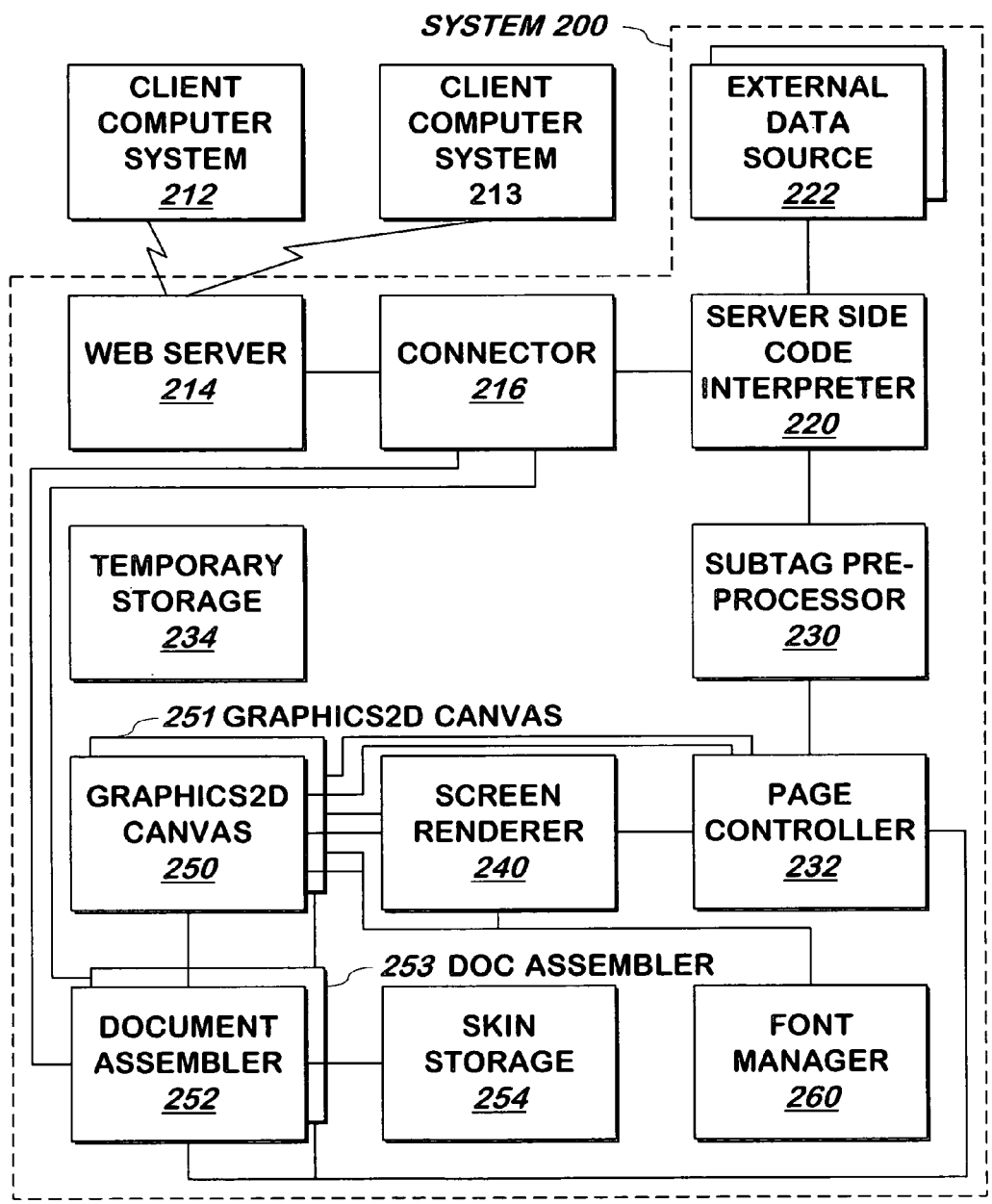
FIG. 2 is a block schematic diagram of a system for producing, in response to a request made to a web server, an output document in any of several page description languages, from a source document containing at least some HTML commands, according to one embodiment of the present invention.

Referring now to FIG. 2, a system for generating an output document in any of several output formats, including a page description language, from a requested web page containing HTML is shown according to one embodiment of the present invention. A request is received from a client computer system 212 or 213 over a network, such as the Internet, by a conventional web server 214. The web server may be any conventional web server, such as a conventional Netscape Enterprise Server commercially available from Netscape Communications, Inc., of Mountain View, Calif., at the web site of Netscape.com. Although only two client computer systems 212, 213 are shown in the Figure, there may be any number of client computer systems 212, 213 in communication with server 214 at any given time.

The web server 214 investigates the extension of the filename of the requested web page. For example, if client computer system 212 requests "test.cfm", web server 214 looks at the extension "cfm" to determine if a connector has registered itself as a connector that handles web pages containing that type of extension.

Connector 216 is a plug in that registers itself as handling one or more extensions. When connector 216 is installed on the computer system on which web server 214 runs, connector reads and modifies a registry that describes, for one or more extensions, the connector that handles that extension. Connector 216 registers a portion of itself that handles files having one or more extensions, such as "cfm". When web server 214 receives a request for a file having that extension, it provides it to connector 216.

Connector 216 receives the name of the file (and optionally, other information such as GET or POST information) from web server 214 and forwards the name of the file (and the other information received) to server side code interpreter 220.

Selection and Modification of the Requested File

Server side code interpreter 220 retrieves the requested file from an internal storage area and interprets the file according to certain conventional server side code instructions contained in the file. The requested file may be a file that has the same name as the name of the file received in the request, or another file that is selected, based on the file name in the request and other information in the request or external to the request. In one embodiment, server side code interpreter 220 includes the conventional ColdFusion MX product commercially available from Macromedia, Inc., of San Francisco, Calif., although the present invention works with any other server side code interpreter, and can work without any server side code interpreter that interprets conventional server side code commands.

In one embodiment, the requested file includes one or more HTML commands that can be used to render by a conventional browser the information in the requested file, as well as server side code. Server side code interpreter 220 uses the requested file, some or all of the server side code instructions in the file, and optionally information from one or more external information sources 222, such as a conventional database (e.g. the conventional SQL server product commercially available from Microsoft Corporation of Redmond, Wash.) or the GET or POST information to build an intermediate file. The intermediate file contains HTML code from the requested file, additional information, which may include HTML code that server side code interpreter 220 builds in accordance with the server side code instructions in the file and the information in the one or more external information sources 222, less the server side code that server side code interpreter 220 processed. In some cases or in all cases, the server side code from the requested file is either not transferred to the intermediate file or replaced in the intermediate file with either HTML code or information from external information sources 222 or both, by server side code interpreter 220.

In one embodiment, server side code interpreter 220 interprets only some of the server side code in the requested file, with other server side code interpreted by subtag preprocessor 230 as described in more detail below. This other server side code is transferred by server side code interpreter 220 into the intermediate file.

Server side code processed by server side code interpreter 220 may include any server side code, such as those processed by the conventional ColdFusion MX product, and described in the help files supplied therewith, the web site of Macromedia.com, and in other resources that describe ColdFusion MX, such as Forta & Weiss, *Macromedia ColdFusion MX Web Application Construction Kit* ($5^{th}$ ed. 2003 Macromedia Press, ISBN 0-321-12516-9) which are hereby incorporated by reference in their entirety. The server side code may be in the form of one or more tags or any other form. When server side code interpreter 220 has completed building the intermediate file, server side code interpreter 220 provides the intermediate file to subtag preprocessor 230.

Subtag preprocessor 230 receives the intermediate file and processes some or all of the remaining server side code contained therein. In one embodiment, the additional tags that make up this remaining server side code are any or all of those described in Appendix A and have the effect described herein. Subtag preprocessor 230 uses the intermediate file to build a preprocessed file that contains much or all of the text and tags of the intermediate file, but has the remaining server side code removed. As it processes the server side code in the intermediate file (or as described below, in the requested file), Subtag preprocessor 230 then builds a subtag record containing attributes or options from the subtags in the file, for example, HTML code and/or text specified as the header or footer. If options or attributes are not specified in the file, subtag preprocessor 230 uses default attributes or options in the subtag record.

Splitting the File for Sections.

In one embodiment, the server side code in the requested file, such as that interpreted by subtag preprocessor 230, contains zero or more logical divisions specifying sections of the document, either explicitly specified using section identifiers, or implicitly specified by identifiers of locations at which point running information, such as the text of headers or footers, should change.

As subtag preprocessor 230 builds the preprocessed file, as it encounters any such logical divisions, it splits the preprocessed file at such divisions to create a set of one or more preprocessed files, so that each file in the set has no divisions. There may be one preprocessed file in the set if no such logical divisions were encountered, or there may be multiple preprocessed file in the set, one more than the number of logical divisions in the intermediate or requested file. Subtag preprocessor names each preprocessed file in the set in such a manner that the original relative order of the information in the set of preprocessed files can be readily ascertained.

In one embodiment, different formatting and other attributes can be specified for each logical division in the requested file. In such embodiment, subtag preprocessor 230 builds a subtag record for each preprocessed file in the set.

The subtag record from the requested file (e.g. that specified outside any section) is copied in order to initialize the subtag record, and then changes specified by the attributes in the section to which the subtag record corresponds are applied to that subtag record, all such steps being performed by subtag preprocessor 230. Thus, if a header and footer is specified for the document, and a header is specified for a first section, and not for a second section, and only those two sections are specified, portions of the document outside the two sections will have a subtag record having the header and footer for the document, the subtag record for the first section will have the header specified for the first section and the footer specified for the document, and the subtag record for the second section will have the header specified for the document and the footer specified for the document.

Subtag preprocessor 230 then stores the set of one or more preprocessed files in an area of temporary disk storage 234, using, for each prepocessed file in the set, a unique filename from any other preprocessed file stored in the area of temporary storage 234. Temporary storage 234 is a portion of conventional memory or disk storage that is used to store information for the purposes described herein. Temporary storage 234 is accessible to the elements of the system that employ it as described herein, but no lines are drawn between temporary storage 234 and each such element in the Figure to avoid cluttering the Figure.

There will be one subtag record for each preprocessed file in the set. Subtag preprocessor 230 adds to the subtag record the filename of the file in temporary storage 234 to which the subtag record corresponds, and provides each subtag record for each preprocessed file in the set to page controller 232.

Single Pass Interpretation of Server Side Code

It isn't necessary that server side code interpreter 220 interpret all of the server side code and provide an intermediate file to subtag preprocessor 230 before subtag preprocessor 230 performs the functions described above. Instead, server side code interpreter 220 and subtag preprocessor 230 may be combined so that only one pass of the requested file provided by web server 214 is used to perform the functions of both server side code interpreter 220 and subtag preprocessor 230 to build the preprocessed file without use of an intermediate file. However, separating them and using two passes can allow the server side code processed by server side code interpreter 220 to generate some or all of the server side code interpreted by subtag preprocessor, allowing not only the content of the document to be generated at the time the request is received by the server, but even the formatting or the type of output document produced to be generated as a result of the interpretation of the server side code by server side code interpreter 220.

Identifying the Number of Pages in Each Preprocessed File.

When page controller 232 receives the one or more subtag records, it performs the functions described herein. For each file in the set of preprocessed files, page controller 232 provides the name of the preprocessed file to screen renderer 240 along with formatting attributes such as the page size, margin information and the like from the subtag record for that file, via a command line interface to screen renderer 240 that requests the number of pages that will be used to render the preprocessed file using the format specified by the formatting attributes. In one embodiment, screen renderer 240 includes the conventional IceBrowser commercially available from IceSoft, of IceSoft Technologies, Inc., of Alberta, Calgary Canada. Screen renderer 240 identifies the number of pages and returns to page controller 232 the number of pages in response to the command sent for each file in the set. As it receives the number of pages in each file in the set, page controller 232 adds the number of pages in each file to the subtag record corresponding to that file.

Instantiating a Graphics2D Canvas for Each Page in the Document

For each file in the set, and for each page in the file, page controller 232 instantiates a graphics2D canvas 250 or 251 corresponding to the type of output file that is specified (or if none is specified, using a default type, either Acrobat or FlashPaper, in one embodiment). A graphics2D canvas is a conventional Java Object that includes storage and methods according to the conventional Graphics2D canvas specifications set forth by Sun Microsystems, of Palo Alto, Calif. Other arrangements for producing pages and/or output documents may be employed by the present invention. Although Acrobat and FlashPaper are used herein, the present invention applies to any output document format.

In one embodiment, there are several graphics2D canvases available for page controller 232 to instantiate, one for each type of page description file that can be rendered by the system and method of the present invention. For example, each instantiation of graphics2D canvas 250 may render its output in the conventional Flash (.swf) file format, and each instantiation of graphics2D canvas 251 may render its output in the conventional Adobe Acrobat (.pdf) file format. The Flash file format available for description at the website macromedia.com/software/flash/open/licensing/fileformat/and the Acrobat file format is described at the website of adobe.com/products/acrobat/adobepdf.html. Graphics2D canvases 250, 251 may accept conventional Graphics2D objects commands from screen renderer 240 and render the output type that each page renderer renders. The selection by page controller 232 of which type of graphics2D canvas 250 or 251 to instantiate corresponds to the format of the output document specified by the tags in the intermediate or requested file, or if no tag specifies the output document format, a default output document format is used. If for example, the Flash file format is designated in the intermediate file or requested file to generate an output document in the FlashPaper file format, page controller 232 will instantiate graphics2D canvas 250, once for each page corresponding to the set of one or more preprocessed files.

Rendering Each Page

For each graphics2D object it instantiates, page controller 232 provides a handle to such object, the corresponding file in the set, the identifier of the page (e.g. page 1, page 2, etc) to which the instance corresponds, and other information from the subtag record corresponding to the file in the set, to screen renderer 240, with instructions to render the designated page into that graphics2D object. Other information in the subtag record that is provided to screen renderer 240 may include HTML code for use in rendering the header and/or footer for that page.

Screen renderer 240 then renders the page according to the preprocessed file and other information, such as header and footer information. Screen renderer 240 invokes graphics2D methods and other data and commands to the instance of the graphics2D canvas having the handle it receives in the command line and the instance of the graphics2D canvas then renders the page into the format corresponding to that graphics2D canvas.

In one embodiment, page controller 232 specifies to screen renderer 240 in the command line, a filename for the output document for each page and screen renderer 240 provides the filename to the instance of the graphics2D canvas 250 or 251 that renders each page, which stores the rendered page in temporary disk storage using that filename. The filename specified for each page by page controller 232 is a filename unique to the other pages that may be stored in temporary disk storage, and filenames corresponding to the same requested file may include similar characters, with a numeric portion corresponding to the page number to which the output file will correspond in the finished output document (so that the order of the pages in the output document is the same as the corresponding source of the information in the requested file) to allow the specification of all of the files by specifying the similar portion and a range of page numbers. In another embodiment, page controller 232 specifies the name of the file in which each page should be stored to the instance of the graphics2D canvas at or after the time it instantiates the graphics2D canvas, for use in saving the file.

When screen renderer 240 and each instance of graphics2D canvas 250 or 251 has completed rendering the pages of all of the files in the set, screen renderer 240 signals page controller 232.

Stitching Together the Pages to Form the Output Document

When so signaled, page controller 232 signals a particular document assembler 252 or 253 with the common portion of the filenames of each of the pages produced as described above and the range of page numbers from all of the pages corresponding to all of the preprocessed files in the set. Each document assembler 252, 253 assembles the pages generated by particular page renderer 250 or 251 into a document using a particular type of page description language, for example, the FlashPaper page description language (which uses the Flash.swf file format) or the Adobe Acrobat page-description language. For purposes of example, document assembler 252 assembles FlashPaper documents and document assembler 253 assembles Adobe Acrobat documents.

An Adobe Acrobat document is a file that is capable of being read by the Adobe Acrobat reader, commercially available from Adobe, Inc., of San Jose Calif. A FlashPaper document is a Flash movie file capable of being read by the Flash Player plug-in to popular browsers, and the Flash Player is commercially available from Macromedia, Inc., of San Francisco, Calif. Because the Flash Player is not a specialized reader with a built-in document-oriented user interface, a Flash Paper document also includes its own user interface controls to allow, for example, a user to move from one page to the next or to the prior page, or to perform other conventional operations.

To assemble pages into an Adobe Acrobat document, document assembler 253 incorporates the pages specified by page controller 232 into a single file in the order of the page numbers, and builds file header and other information, such as a table of contents for pages and starting locations, in the document. Page assembler 253 may store the output document in a temporary area of storage, using the common portion of the name of the files containing the pages, and the requested extension such as ".cfm" ".cfml" or ".cfc". In one embodiment, document assembler 253 includes the conventional Itext product available from the website lowagie.com/iText/.

To assemble pages into a FlashPaper document, document assembler 252 assembles the pages specified by page controller 232 into a ".swf" Flash Movie file, using an existing file, referred to as a "skin", stored in skin storage 254, which may be a portion of memory or disk storage. The skin is used as a starting point for the generation of the output document, and may be created using the conventional Flash authoring tool commercially available from Macromedia, Inc. Pages are added to the skin and the action script controls from the skin are modified (or new action script is added, or both) to correspond to the number of pages added. In one embodiment, the skin is a Flash Movie file that is arranged to accommodate 100 pages of document content, each of which are arranged as a different Flash movie clip, and descend from a master movie clip that contains user interface controls such as buttons and/or menu commands to navigate among the movie clips containing pages of the document, print the document or perform other functions with respect to it. The user interface controls are bound to action script commands that control the operation in a conventional fashion. For example, two buttons corresponding to user interface controls to move either forward one page or back one page contain Action Script commands to perform the indicated option if a page exists in the direction corresponding to that button, or Action Script commands to dim or "grey out" the button and not perform any function (or to ring a bell or otherwise indicate an error) if the button is clicked if no such page exists in the direction corresponding to the button.

The Action Script commands modified or inserted by document assembler 252 are conventional compiled Flash Action Script, which may be identified by compiling a sample.swf file programmed with the user interface controls desired in the output document using the conventional Flash authoring tool commercially available from Macromedia, Inc, using the desired action script commands, and then reviewing the compiled action script commands in a.swf file that has been reverse compiled using the specification described above. This allows the identification of the manner in which action script can be added to the skin or modified within it to produce the desired effect in the output document.

Providing the Output Document to the Requesting Client.

The document assembler 252 or 253 that assembles the output document stores the output document in temporary storage 234 and provides its filename (which may have been specified by page controller 232) to connector 216, which provides it to web server 214, using the same web server thread that was used to send the name of the requested file. The document assembler 252 or 253 also specifies to connector 216 the content type to be provided with the output document, for example, either Application/PDF or application/xshockwave-flash. Connector 216 provides the content type to web server 214

Web server 214 retrieves the output document from temporary storage 234 and provides the output document with the specified content type to the client computer system 212, 213 that sent the request. The browser in the client computer system 212, 213 will provide the output document to the plug in (e.g. Acrobat or the Flash Player) registered to handle the content type specified.

It is noted that the content of the requested file may be used to generate an HTML file, by simply removing the server side code interpreted by subtag preprocessor 230. Alternatively, such code can be added to a requested file that would otherwise be rendered as HTML.

As described herein, various files may be employed. However, in other embodiments, information from some or all of the files described herein may be streamed or provided via memory, from the producer of the information to the recipient of the information so that the actual files are not generated.

Font Processing to Build FlashPaper Documents.

In one embodiment, fonts may be handled differently for FlashPaper than for other types of output documents. In such embodiment, it is possible to include glyphs only for the characters used in the output document to minimize the number of glyphs in the output document, thereby making it smaller and faster to download.

As each instance of graphics2D canvas 250 renders each page, it calculates the glyphs it uses to render each character. The instance of the graphics2D canvas maintains a table of the fonts used on that page, and for each font, the characters used on that page and their respective glyphs, and appends the table to the end of the file.

Document assembler 252 then generates a master table by combining the tables from each page and eliminating any duplicates. Document assembler 252 formats the list into the Flash font tag so that the Flash player will have the glyphs it needs to render all of the characters in the output document, but none of the glyphs it does not need. The Flash font tag is placed near the beginning of the output document file, in accordance with the Flash specification.

Font Handling.

In one embodiment, each of the page renderers 250, 251, screen renderer 240 or all of these will employ font files in the rendering of the pages of the requested file.

In one embodiment, to locate fonts, they send a request to a font factory class object. In one embodiment, font manager 260 is such an object, is specified for use by some or all of them 240, 250, 251, and supplies the location of the file corresponding to a requested font.

To determine the locations of the fonts installed on the server or servers that run system 200, font manager 260 locates file in any one or more of several types of locations. One type of locations is commonly used locations of font files, for example c:/windows/system/fonts for a server running the Windows operating system. Upon installation, font manager 260 investigates all such locations and looks for files that indicate they are font files, for example, files with the extension ".TTF", ".TTC", ".AFM", or ".PBF". If it locates any such file, font manager 260 reads the file and identifies the name of the font contained therein and adds it and the filename and path of the file to a font table of font names and file names and paths.

Another type of location is one or more locations that a user specifies to font manager 260, using a user interface font manager 260 provides when a user runs an executable portion of font manager 260. Font manager 260 allows the user, via a conventional keyboard, monitor and mouse attached to the computer system running the executable portion of font manager 260 to specify directories of font files, that font manager 260 scans for font files and uses to add additional entries to the font table as described above. In one embodiment, a user can also specify individual font files, which font manager 260 uses to add an additional entry to the font table as described above for each such file.

When a font is requested, font manager 260 looks up the name of the requested font in the table and supplies the name and path of the font associated therewith.

In one embodiment, certain fonts are requested using logical font names (e.g. "serif"), without any specific font name. Font manager 260 stores a default translation table that maps logical font names to actual fonts in the font table (e.g. "serif" may be mapped to "Times New Roman"), and the executable portion of font manager 260 allows the user to change these mappings by selecting, for any logical font name, a font from the font table, which font manager 260 stores in the translation table (or the user may substitute a different file that contains the mappings). When a logical font is requested, font manager 260 supplies the name and path of the font file that should be used for that logical font by looking up the requested logical font in the translation table, identifying in the translation table the name of the font to be used, and then using the font table to identify the name and path of the file containing that font.

In one embodiment, font manager 260 retrieves the language (i.e. locale) the user specified to the operating system, and the file containing the mappings of logical font names is selected from various files used for various languages based on that operating system-specified language. The file may be selected by appending a language code to the end of the name of the English-language mapping file (e.g. if "cffont.properties" is the English language file name, "cffont.properties.ja" is used in the event that the language is Japanese. A user may substitute their own files for any of these files to change the mappings.

Live HTML Embed Links.

In one embodiment, if the requested document contains any links, screen renderer 240 invokes a non-Graphics2D method of each of the Graphics2D canvases and includes the URL from the link and the coordinates on the page at which the link would be rendered. Graphics2D canvases 250, 251 respond to the invocation of the method by rendering the URL in a different color to make it appear to be a clickable link, and generate the proper code for the type of output document format they produce to make the region around the URL a clickable region that will cause the Adobe Acrobat Reader or Flash Player to provide the URL to the user's browser if the user clicks the region so that the browser can at least retrieve the contents specified by the URL and render them using conventional techniques.

Missing Images/AltText Handling.

In one embodiment, screen renderer 240 provides URLs of any images and coordinates of the area in which any images are to be displayed to the graphics2D canvas 250 or 251 it is using. Graphics2D canvas 250 or 251 responds by retrieving the images using the URL to render them, via conventional communications techniques. If the image is unavailable (e.g. its size is zero), either or both of the graphics2D canvases 250 or 251 will leave a blank space in place of the image. In one embodiment, if alternate text is part of the requested document or the preprocessed document, screen renderer 240 will provide the alternate text and graphics2D canvas 250, 251 will render the text in the blank space.

Method.

Figure 3:
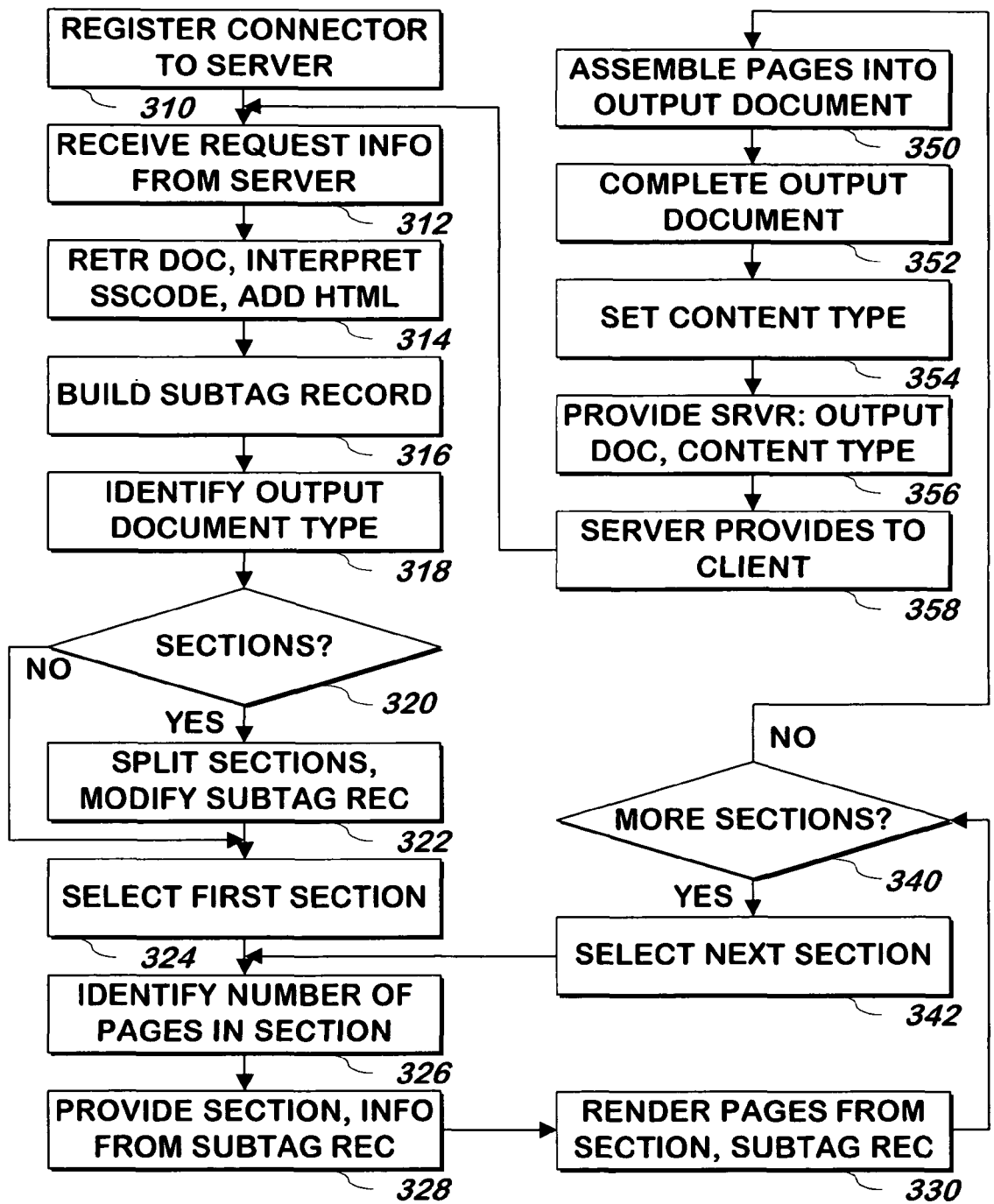
FIG. 3 is a flowchart illustrating a method of producing, in response to a request made to a web server, an output document in any of several page description languages, form a source document containing at least some HTML commands, according to one embodiment of the present invention.

Referring now to FIG. 3, a method of producing an output document in any of several page description file formats, such output document being produced in response to a request made to a web server, is shown according to one embodiment of the present invention.

A connector or other plug in is registered 310 to a server as being able to handle one or more types of requested documents as described above. Some or all of a request made to a web server is received 312, for example, via the connector registered to the web server in step 310. The information from the request received in step 312 may include a filename that formed part of a request made to the web server.

A requested file, which may or may not contain HTML and, that corresponds to the information in the request is received and, optionally, certain server side code is interpreted, and removed from the file, and other HTML is added to the file in response to any or all of the server side code and one or more external data sources 314. A subtag record containing information from other server side code, default information, or both is built 316 and an output document file format from several possible output document file formats is identified 318 from the subtag record. The output document file formats may include any of several page description languages as described above. Step 316 may include removing code from the document as described above.

If the requested (or an intermediate) file is divided into sections, either explicitly via server side code that specifies a new section is to begin, or implicitly via server side code that changes something that can be facilitated by splitting the file into sections 320, the file is split 322 into one or more files at the appropriate boundary, for example, at the point in the file where a header or footer is changed and the method continues at step 324, and otherwise 320, the method continues at step 324, with the file treated as having one section. Step 322 may include modifying the subtag record in accordance with server side code that applies to each section.

At step 324, the first section in the file is selected, and the number of pages in the selected section is identified 326, the selected section of the file, as modified as described herein, and information from the subtag record for the selected section is provided 328 and the pages from the section are rendered 330 into an output document using the section of the document and none, some, or all of the information from the subtag record for that section. Step 330 includes rendering the pages in the type of output document identified in step 318.

If there are any more sections in the document 340, the next section is selected 342 and the method continues at step 326 using that newly selected section, and otherwise 340, the method continues at step 350.

At step 350, the pages from all of the sections are assembled to produce an output document in the file format, and additional information is either modified or created or both to complete the output document 352. Step 352 may include combining the pages with a predefined, or partially predefined skin as described above. The content type is set to the type of output document identified in step 318 and the output document and content type are provided 356 to the server (and optionally, to the thread) from which the request information was received, and the server provides 358 the output document and content type to the client from which it received the request, and the method continues at step 312.

In one embodiment, fonts are rendered at step 326 and/or 330 via the font discovery techniques described above.

Appendix A

Server Side Code

CFDocument tag

Creating PDF and FlashPaper output with the cfdocument tag

The cfdocument tag converts everything between its start and end tags into PDF or FlashPaper and returns it to the browser or saves it to a file. This lets you easily convert HTML to printable output, as the following example shows:

```
<cfdocument format="FlashPaper">
<p>This is a document rendered by the
    cfdocument tag.</p>
</cfdocument>
```

The cfdocument tag supports all HTML and CFML tags, with the following exceptions:

- cfchart
- Macromedia Flash content
- Interactive tags, such as form, cfform, and cfapplet Additionally, the HTML wrapped by the cfdocument tag must be well-formed, with end tags for every start tag and proper nesting of block-level elements.

*Note:* ColdFusion MX does not return HTML and CFML outside of the <cfdocument> </cfdocument> pair.

Creating basic reports from HTML and CFML

You can convert HTML-based reports into PDF or FlashPaper output by wrapping the HTML in the cfdocument start and end tags, and specifying cfdocument attributes, as appropriate, to customize the following items:

- Page size
- Page orientation
- Margins
- Encryption (PDF only)
- User password and owner password (PDF only)
- Permissions (PDF only)

For complete information on these options, refer to the cfdocument discussion in *CFML Reference*.

Note: Embedding fonts in the report can help ensure consistent display across multiple browsers and platforms. For more information on the considerations related to embedding fonts, see "Font management with printable reports" on page 814.

The following example displays a list of employees, using a cfoutput tag to loop through the query:

```
<cfdocument format="flashpaper">
<h1>Employee List</h1>
<!--- Inline query used for example purposes only --->
<cfquery name="EmpList" datasource="cfdocexamples">
    SELECT FirstName, LastName, Salary, Contract
    FROM Employee
</cfquery>
<cfoutput query="EmpList">
#EmpList.FirstName#, #EmpList.LastName#, #LSCurrencyFormat(EmpList.Salary)#,
    #EmpList.Contract#<br>
</cfoutput>
</cfdocument>
```

Creating sections, headers, and footers

You can use the cfdocumentitem and cfdocumentsection tags to fine-tune your printable output, as follows:

- cfdocumentitem   Creates page breaks, headers, or footers.
- cfdocumentsection   Divides output into sections, optionally specifying custom margins. Within a section, use the cfdocumentitem tag to specify unique headers and footers for each section.

cfdocumentitem

You use one or more cfdocumentitem tags to specify headers and footers or to create a page break. You can use cfdocumentitem tags with or without the cfdocumentsection tag, as follows:

- With cfdocumentsection   The cfdocumentitem attribute applies only to the section, and overrides previously specified headers and footers.
- Without cfdocumentsection   The cfdocumentitem attribute applies to the entire document, as follows:
  - If the tag is at the top of the document, it applies to the entire document.
  - If the tag is in the middle of the document, it applies to the rest of the document.
  - If the tag is at the end of the document, it has no affect.

You can use the cfdocumentitem tag to create a running header for an entire document, as the following example shows:

```
<cfdocument format="PDF">
<!--- Running header --->
```

```
<cfdocumentitem type="header">
  <font size="-3"><i>Directory Report</i></font>
</cfdocumentitem>
<h3>cfdirectory Example</h3>
<!--- Use cfdirectory to display directories by name and size --->
<cfdirectory
    directory="#GetDirectoryFromPath(GetTemplatePath())#"
    name="myDirectory" recurse="yes"
    sort="directory ASC, name ASC, size DESC">
<!---- Output the contents of the cfdirectory as a cftable ----->
<cftable query="myDirectory"
    htmltable colheaders>
    <cfcol header="DIRECTORY:" text="#directory#">
    <cfcol header="NAME:" text="#Name#">
    <cfcol header="SIZE:" text="#Size#">
</cftable>
</cfdocument>
``` cfdocumentsection

When using cfdocumentsection, all text in the document must be enclosed within cfdocumentsection tags. ColdFusion MX ignores HTML and CFML outside of cfdocumentsection tags. The margin attributes override margins specified in previous sections or in the parent cfdocument tag. If you specify margin attributes, the units are controlled by the unit attribute of the parent cfdocument tag; the default for the unit attribute is inches.

Within a section, use the cfdocumentitem tag to specify unique headers and footers for each section and a page break before each section, as the following example shows:

```
<cfquery datasource="cfdocexamples" name="empSalary">
SELECT Emp_ID, firstname, lastname, e.dept_id, salary, d.dept_name
FROM employee e, departmt d
WHERE e.dept_id = d.dept_id
ORDER BY d.dept_name
</cfquery>

<cfdocument format="PDF">
  <cfoutput query="empSalary" group="dept_id">
  <cfdocumentsection>
  <cfdocumentitem type="header">
    <font size="-3"><i>Salary Report</i></font>
  </cfdocumentitem>
  <cfdocumentitem type="footer">
    <font size="-3">Page #cfdocument.currentpagenumber#</font>
  </cfdocumentitem>
  <h2>#dept_name#</h2>
    <table width="95%" border="2" cellspacing="2" cellpadding="2" >
    <tr>
      <th>Employee</th>
      <th>Salary</th>
    </tr>
    <cfset deptTotal = 0 >
    <!--- inner cfoutput --->
    <cfoutput>
```

```
       <tr>
           <td><font size="-1">
           #empSalary.lastname#, #empSalary.firstname#</font>
       </td>
       <td align="right"><font size="-1">
           #DollarFormat(empSalary.salary)#</font>
       </td>
           </tr>
       <cfset deptTotal = deptTotal + empSalary.salary>
   </cfoutput>
   <tr>
           <td align="right"><font size="-1">Total</font></td>
       <td align="right"><font size="-1">#DollarFormat(deptTotal)#</font></td>
           </tr>
       <cfset deptTotal = 0>
       </table>
       </cfdocumentsection>
   </cfoutput>
</cfdocument>
```

Using the cfdocument scope

When you use the cfdocument tag, ColdFusion MX creates a new scope named cfdocument. This scope contains the following variables:

- currentpagenumber  Displays the current page number.
- totalpagecount  Displays the total page count.

*Note:* The cfdocument scope variables are reserved for page number rendering. Do not use them in ColdFusion expressions.

You typically use these variables in a header or footer to display the current page number and total number or pages, as the following example shows:

```
<cfdocumentitem type= "footer> #cfdocument.currentpagenumber# of
   #cfdocument.totalpagecount#</cfdocumentitem>
```

Using cfhttp to display web pages

You can use the cfhttp tag in combination with the cfdocument tag to display entire web pages in PDF or FlashPaper format, as the following example shows:

```
<!--- You can pass a URL in the URL string --->
<cfparam name="url.target_url" default="http://www.boston.com">
<cfoutput>
<cfhttp url="#url.target_url#" resolveurl="yes">

<cfdocument format="FlashPaper">
<cfdocumentitem type="header">
   <cfoutput>#url.target_url#</cfoutput>
</cfdocumentitem>
<cfdocumentitem type="footer">
   <cfoutput>#cfdocument.currentpagenumber# /
      #cfdocument.totalpagecount#</cfoutput>
</cfdocumentitem>
```

```
<!--- Display the page --->
#cfhttp.filecontent#
</cfdocument>
</cfoutput>
```

Using advanced PDF options

The cfdocument tag supports the Acrobat security options, as the following table shows:

| Security option | Description |
| --- | --- |
| Encryption | Use the encryption attribute to specify whether PDF output is encrypted. Specify one of the following:<br>• 128-bit<br>• 40-bit<br>• none |
| User password | Use the userpassword attribute to specify a password that users must enter to view the document. |
| Owner password | Use the ownerpassword attribute to specify a password that users must enter to view and optionally modify the document. |

Additionally, the cfdocument tag supports the following Acrobat security permissions through the permissions attribute. Specify one or more of the following values; separate multiple permissions with a comma:

| Permission | Description |
| --- | --- |
| Printing | Specify the AllowPrinting attribute to enable viewers to print the document. |
| Modification | Specify the AllowModifyContents attribute to let viewers modify the document, assuming they have the required software. |
| Copy | Specify the AllowCopy attribute to let viewers select and copy text from the document. |
| Annotation | Specify AllowModifyAnnotations to let viewers add comments to the document. If users add annotations, they must save the PDF after making changes. |
| Screen readers | Specify AllowScreenReaders to enable access to the document through a screen reader. |
| Fill in | Specify AllowFillIn to enable users to use form fields. |
| Assembly | Specify AllowAssembly to enable users to create bookmarks and thumbnails, as well as insert, delete, and rotate pages. |
| Degraded printing | Specify AllowDegradedPrinting to enable low-resolution printing. Low resolution printing prints each page as a bitmap, so printing may be slower. |

Note: The defaults for these options vary, based on encryption level. These options apply to PDF only. For more information, see the cfdocument discussion in *CFML Reference*.

The following example creates a PDF document that allows copying only:

```
<cfdocument format="PDF" encryption="40-bit"
    ownerpassword="us3rpa$$w0rd" userpassword="us3rpa$$w0rd"
    permissions="AllowCopy" >
<h1>Employee List</h1>
<cfquery name="EmpList" datasource="cfdocexamples">
    SELECT FirstName, LastName, Salary
    FROM Employee
</cfquery>
<cfoutput query="EmpList">
#EmpList.FirstName#, #EmpList.LastName#,
    #LSCurrencyFormat(EmpList.Salary)#<br>
</cfoutput>

</cfdocument>
```

Saving printable reports in files

You can use the `cfdocument filename` attribute to save the generated PDF or SWF output to a file, as the following example shows:

```
<cfquery datasource="compasstravel" name="compasstrips">
SELECT tripName, tripDescription, tripLocation, price
FROM trips
ORDER BY price
</cfquery>
<cfdocument format="pdf" filename="#GetDirectoryFromPath(GetTemplatePath())#/
    compasstrips.pdf" overwrite="yes">
  <cfdocumentsection>
    <h1 align="center">Compass Travel</h1>
    <h2 align="center">Destination Guide</h2>
    <p align="center"><img src="cfdocs/getting_started/photos/
    somewhere.jpg"></p>
  </cfdocumentsection>
  <cfdocumentsection>
    <cfdocumentitem type="header">
      <font size="-3"> <i>Compass Travel Trip Descriptions</i></font>
    </cfdocumentitem>
    <cfdocumentitem type="footer">
      <font size="-3"> <cfoutput>Page #cfdocument.currentpagenumber#</
    cfoutput> </font>
    </cfdocumentitem>
    <cfoutput query="compasstrips">
      <hr>
      <h2>#tripName#</h2>
      <p><b>#tripLocation#</b></p>
      <p>Price: #DollarFormat(price)#</p>
      <p>#tripDescription#</p>
    </cfoutput>
  </cfdocumentsection>
</cfdocument>
``` cfdocument

Description

Creates PDF or FlashPaper output from a text block containing CFML and HTML.

Category

Data output tags

Syntax

```
<cfdocument
    format = "PDF or FlashPaper"
    filename = "file name"
    overwrite = "yes" or "no"
    name = "output variable name"
    pagetype = "page type"
    pageheight = "page height in inches"
    pagewidth = "page width in inches"
    orientation = "portrait/landscape"
    margintop = "number"
    marginbottom = "number"
    marginleft = "number"
    marginright = "number"
    unit = "in" or "cm"
    encryption = "128-bit" or "40-bit" or "none"
    ownerpassword = "password"
    userpassword = "password"
    permissions = "permission list"
    fontembed = "yes" or "no"
    backgroundvisible = "yes" or "no"
    scale = "percentage less than 100">

HTML and CFML code
</cfdocument>
```

See also cfreport, cfdocumentitem, cfdocumentsection

History

Blackstone: Added this tag.

Attributes

| Attribute | Req/Opt | Default | Description |
| --- | --- | --- | --- |
| format | Required | | Specifies the report format.<br>• PDF<br>• FlashPaper |
| filename | Optional | | Specifies the fully qualified path name of a file to contain the PDF or FlashPaper output.<br><br>If you omit the filename attribute, ColdFusion MX streams output to the browser. |

| Attribute | Req/Opt | Default | Description |
| --- | --- | --- | --- |
| overwrite | Optional | no | Specifies whether ColdFusion MX overwrites an existing file. Used in conjunction with *filename*. |
| name | Optional | | Specifies the name of an existing variable into which the tag stores the PDF or FlashPaper output. |
| pagetype | Optional | A4 | Specifies the page size into which ColdFusion generates the report.<br>• legal: 8.5 inches x 14 inches<br>• letter: 8.5 inches x 11 inches<br>• A4: 8.27 inches x 11.69 inches<br>• A5: 5.81 inches x 8.25 inches<br>• B5: 9.81 inches x 13.88 inches<br>• Custom: Custom height and width. If you specify custom, you must also specify the pageheight and pagewidth attributes, can optionally specify margin attributes, and can optionally specify whether the units are inches or centimeters. |
| pageheight | Optional | | Specifies the page height in inches (default) or centimeters. This attribute is only valid if pagetype=custom. To specify page height in centimeters, include the unit=cm attribute. |
| pagewidth | Optional | | Specifies the page width in inches (default) or centimeters. This attribute is only valid if pagetype=custom. To specify page width in centimeters, include the unit=cm attribute. |
| orientation | Optional | portrait | Specifies the page orientation. Specify either of the following:<br>• portrait<br>• landscape |
| margintop | Optional | | Specifies the top margin in inches (default) or centimeters. To specify top margin in centimeters, include the unit=cm attribute. |
| marginbottom | Optional | | Specifies the bottom margin in inches (default) or centimeters. To specify bottom margin in centimeters, include the unit=cm attribute. |
| marginleft | Optional | | Specifies the left margin in inches (default) or centimeters. To specify left margin in centimeters, include the unit=cm attribute. |
| marginright | Optional | | Specifies the right margin in inches (default) or centimeters. To specify right margin in centimeters, include the unit=cm attribute. |
| unit | Optional | in | Specifies the default unit for pageheight, pagewidth, and margin attributes. Specify either of the following:<br>• in  Inches<br>• cm  Centimeters |

| Attribute | Req/Opt | Default | Description |
|---|---|---|---|
| encryption | Optional | None | (format="PDF" only) Specifies whether the output is encrypted. Specify one of the following:<br>• 128-bit<br>• 40-bit<br>• none |
| ownerpassword | Optional | | (format="PDF" only) Specifies an owner password. |
| userpassword | Optional | | (format="PDF" only) Specifies a user password. |
| permissions | Optional | | (format="PDF" only) Specifies one or more of the following permissions:<br>• AllowPrinting<br>• AllowModifyContents<br>• AllowCopy<br>• AllowModifyAnnotations<br>• AllowFillIn<br>• AllowScreenReaders<br>• AllowAssembly<br>• AllowDegradedPrinting<br>Separate multiple permissions with a comma. |
| fontembed | Optional | yes | Specifies whether ColdFusion embeds fonts in the output. Specify one of the following:<br>• yes: Embed fonts<br>• no: Do not embed fonts.<br>Selective: Embed all fonts except Java fonts and core fonts. For more information, see Usage.. |
| backgroundvisible | Optional | no | Specifies whether the background prints when the user prints the document. Specify one of the following:<br>• yes: Include the background when printing.<br>• no: Do not include the background when printing. |
| scale | Optional | Calculated by ColdFusion | Specifies a scale factor as a percentage. Use this option to reduce the size of the HTML output so that it fits on that paper. Specify a number less than 100. |

Usage

Use the cfdocument tag to render HTML and CFML output into PDF or FlashPaper format. ColdFusion MX does not return HTML and CFML outside of the <cfdocument> </cfdocument> pair.

The cfdocument tag can render HTML that supports the following standards:

- HTML 4.01
- XML 1.0
- DOM Level 1 and 2
- CSS1 and CSS2

The cfdocument tag does not support the Internet Explorer-specific HTML generated by Microsoft Word.

The PDF or FlashPaper document returned by the cfdocument tag overwrites any previous HTML in the input stream and ignores any HTML after the </cfdocument> tag.

You cannot embed a cfreport tag in a cfdocument tag.

When you use the cfdocument tag, ColdFusion MX creates a new scope named cfdocument. This scope contains the following variables:

- currentpagenumber
- totalpagecount

*Note:* The cfdocument scope variables are reserved for page number rendering. Do not use them in ColdFusion expresions. For example, the following code does not work:

```
<cfif cfdocument.currentpagenumber gt 1>
  <cfoutput>#cfdocument.currentpagenumber-1#</cfoutput>
</cfif>
```

Example
```
<cfdocument format="flashpaper">
<p>This is a document rendered by the
   cfdocument tag.</p>

<table width="50%" border="2" cellspacing="2" cellpadding="2">
  <tr>
    <td><strong>Name</strong></td>
    <td><strong>Role</strong></td>
  </tr>
  <tr>
    <td>Bill</td>
    <td>Lead</td>
  </tr>
  <tr>
    <td>Susan</td>
    <td>Principal Writer</td>
  </tr>
  <tr>
    <td>Adelaide</td>
    <td>Part Time Senior Writer</td>
  </tr>
  <tr>
    <td>Thomas</td>
    <td>Full Time for 6 months</td>
  </tr>
  <tr>
    <td>Michael</td>
    <td>Full Time for 4 months</td>
  </tr>
</table>
</cfdocument>
``` cfdocumentitem

Description

Specifies action items for a PDF or FlashPaper document created by the cfdocument tag. Actions include the following:

- Page break
- Header
- Footer

Category

Data output tags

Syntax

```
<cfdocument ...>
Syntax 1
<cfdocumentitem type = "pagebreak"/>

Syntax 2
   <cfdocumentitem
      type = "header" or "footer">
   header/footer text
   </cfdocumentitem>

</cfdocument>
```

See also cfreport, cfdocument, cfdocumentsection

History

Blackstone: Added this tag.

Attributes

| Attribute | Req/Opt | Default | Description |
|---|---|---|---|
| Type | Required | | Specifies the action.<br>• pagebreak: Start a new page at the location of the tag.<br>• header: Use the text between the <cfdocumentitem> and </cfdocumentitem> as the running header.<br>• footer: Use the text between the <cfdocumentitem> and </cfdocumentitem> as the running footer. |

Usage

Use the cfdocumentitem tag to control the formatting of a PDF or FlashPaper report. This tag must be wrapped inside a <cfdocument> </cfdocument> pair.

Code one cfdocumentitem tag for each pagebreak, running header, or running footer.

You can use the cfdocument scope variable, cfdocument.currentpagenumber to display the current page number in a header or footer. You can also use cfdocument.totalpagecount to display the total number of pages. For example:

```
...
<cfdocumentItem type="footer>
    #cfdocument.currentpagenumber# of #cfdocument.totalpagecount#
</cfdocumentitem>
```

You can use cfdocumentitem tags with or without the cfdocumentsection tag, as follows:

- Without cfdocumentsection The cfdocumentitem attribute applies to the entire document, as follows:
  - If the tag is at the top of the document it applies to the entire document.
  - If the tag is in the middle of the document, it applies to the rest of the document.
  - If the tag is at the end of the document, it has no affect.
- With cfdocumentsection tags The cfdocumentitem attribute applies only to the section and overrides previously specified header and footer specifications.

Example

```
<cfquery datasource="cfdocexamples" name="parksQuery">
SELECT parkname, suptmgr from parks
</cfquery>

<cfdocument format="PDF">
  <cfdocumentitem type="header">National Parks Report</cfdocumentitem>
  <!--- Use a footer with current page of totalpages format --->
  <cfdocumentitem type="footer">
    <cfoutput>Page #cfdocument.currentpagenumber# of
  #cfdocument.totalpagecount#</cfoutput>
  </cfdocumentitem>

<h1>Park list</h1>
<table width="95%" border="2" cellspacing="2" cellpadding="2" >
  <tr >
    <th>Park</th>
    <th>Manager</th>
  </tr>
  <cfoutput query="parksQuery">
    <tr>
      <td><font size="-1">#parkname#</font></td>
      <td><font size="-1">#suptmgr#</font></td>
    </tr>
  </cfoutput>
</table>
</cfdocument>
``` cfdocumentsection

Description

Divides a PDF or FlashPaper document into sections. By using this tag in conjunction with cfdocumentitem, each section can have unique headers, footers, and page numbers.

Category

Data output tags

Syntax

```
<cfdocument ...>

<cfdocumentsection
       margintop = "number"
       marginbottom = "number"
       marginleft = "number"
       marginright = "number">

HTML, CFML, and cfdocumentitem tags
    </cfdocumentsection>

</cfdocument>
```

See also cfreport, cfdocument, cfdocumentitem

History

Blackstone: Added this tag. New in Alpha 2: margintop, marginbottom, marginleft, marginright attributes.

Attributes

| Attribute | Req/Opt | Default | Description |
| --- | --- | --- | --- |
| margintop | Optional | | Specifies the top margin in inches (default) or centimeters. To specify top margin in centimeters, include the unit="cm" attribute in the parent cfdocument tag. |
| marginbottom | Optional | | Specifies the bottom margin in inches (default) or centimeters. To specify bottom margin in centimeters, include the unit="cm" attribute in the parent cfdocument tag. |
| marginleft | Optional | | Specifies the left margin in inches (default) or centimeters. To specify left margin in centimeters, include the unit="cm" attribute in the parent cfdocument tag. |
| marginright | Optional | | Specifies the right margin in inches (default) or centimeters. To specify right margin in centimeters, include the unit="cm" attribute in the parent cfdocument tag. |

Usage

Use the `cfdocumentsection` tag to divide a report into sections. You can use one or more `cfdocumentitem` tags to specify unique headers and footers for each section.

When using `cfdocumentsection`, all text in the document must be enclosed within `cfdocumentsection` tags. ColdFusion MX ignores HTML and CFML outside of `cfdocumentsection` tags.

The margin attributes override margins specified in previous sections or in the parent `cfdocument` tag. If you specify margin attributes, the units are controlled by the `unit` attribute of the parent `cfdocument` tag, which default to inches.

Example

```
<cfquery datasource="cfdocexamples" name="empSalary">
SELECT Emp_ID, firstname, lastname, e.dept_id, salary, d.dept_name
FROM employee e, departmt d
WHERE e.dept_id = d.dept_id
ORDER BY d.dept_name
</cfquery>

<cfdocument format="PDF">
  <cfoutput query="empSalary" group="dept_id">
  <cfdocumentsection>
  <cfdocumentitem type="header">
     <font size="-3"><i>Salary Report</i></font>
  </cfdocumentitem>
  <cfdocumentitem type="footer">
     <font size="-3">Page #cfdocument.currentpagenumber#</font>
  </cfdocumentitem>
  <h2>#dept_name#</h2>
   <table width="95%" border="2" cellspacing="2" cellpadding="2" >
    <tr>
     <th>Employee</th>
     <th>Salary</th>
    </tr>
    <cfset deptTotal = 0 >
    <!--- inner cfoutput --->
    <cfoutput>
     <tr>
        <td><font size="-1">
       #empSalary.lastname#, #empSalary.firstname#</font>
       </td>
       <td align="right"><font size="-1">
        #DollarFormat(empSalary.salary)#</font>
       </td>
      </tr>
     <cfset deptTotal = deptTotal + empSalary.salary>
    </cfoutput>
    <tr>
        <td align="right"><font size="-1">Total</font></td>
        <td align="right"><font size="-1">#DollarFormat(deptTotal)#</font></td>
        </tr>
    <cfset deptTotal = 0>
    </table>
```

```
    </cfdocumentsection>
  </cfoutput>
</cfdocument>
```

What is claimed is:

1. A method of providing a page description file, comprising:
   receiving a request for content;
   retrieving a first file responsive to the request, the first file comprising a plurality of HTML tags and at least one non-HTML tag, wherein one or more of the at least one non-HTML tag identifies a type of page description file;
   building a second file, different from the first file, comprising at least some of the plurality of HTML tags and at least one result from interpreting at least one of the at least one non-HTML tag;
   assigning attributes to information in the second file; and
   providing the page description file responsive to the second file and the attributes,
   wherein providing the page description file includes rendering at least some of the information in the second file and the attributes into the page description file.

2. The method of claim 1, wherein the type of page description file is selectable from a plurality of page description file types.

3. The method of claim 2, wherein the plurality of page description file types comprises Adobe Acrobat.

4. The method of claim 1, wherein providing the page description file further comprises:
   rendering a plurality of pages responsive to the second file and the attributes to produce a plurality of rendered pages; and
   assembling the pages into the page description file.

5. The method of claim 1, wherein interpreting at least one of the at least one non-HTML tag provides at least one additional non-HTML tag, and building the second file comprises interpreting the at least one additional non-HTML tag.

6. A computer program product comprising a computer useable medium having computer readable program code embodied therein for providing a page description file, the computer program product comprising computer readable program code devices configured to cause a computer system to:
   receive a request for content;
   retrieve a first file responsive to the request, the first file comprising a plurality of HTML tags and at least one non-HTML tag, wherein one or more of the at least one non-HTML tag identifies a type of page description file;
   build a second file, different from the first file, comprising at least some of the plurality of HTML tags and at least one result from interpreting at least one of the at least one non-HTML tag;
   assign attributes to information in the second file; and
   provide the page description file responsive to the second file and the attributes,
   wherein the computer readable program code devices configured to cause a computer system to provide the page description file include computer readable program code devices configured to cause the computer system to render at least some of the information in the second file and the attributes into the page description file.

7. The computer program product of claim 6, wherein the type of page description file is selectable from a plurality of page description file types.

8. The computer program product of claim 7, wherein the plurality of page description types comprises Adobe Acrobat.

9. The computer program product of claim 6, wherein the computer readable program code devices configured to cause the computer system to provide the page description file comprise computer readable program code devices configured to cause the computer system to:
   render a plurality of pages responsive to the second file and the attributes to produce a plurality of rendered pages; and
   assemble the pages into the page description file.

10. The computer program product of claim 6, wherein interpreting at least one of the at least one non-HTML tag provides at least one additional non-HTML tag, and the computer readable program code devices configured to cause the computer system to build the second file comprises computer readable program code devices configured to cause the computer system to interpret the at least one additional non-HTML tag.

11. A system for providing a page description file, comprising:
   a computer system including a processor, the computer system comprising:
      a web server having an input for receiving a request for content, the web server for providing at a web server output at least a portion of the request;
      a server side code interpreter having an input coupled to the web server output for receiving the at least the portion of the request, the server side code interpreter for retrieving a first file responsive to the at least the portion of the request, the first file comprising a plurality of HTML tags and at least one non-HTML tag, wherein one or more of the at least one non-HTML tag identifies a type of page description file, and for building via an output a second file, different from the first file, comprising at least some of the plurality of HTML tags and at least one result from interpreting at least one of the at least one non-HTML tag and for providing an identifier of the second file at a second output;
      a subtag preprocessor having an input coupled to the server side code interpreter second output for receiving the identifier of the second file, the subtag preprocessor for assigning attributes to information in the second file and providing information from the second file and the attributes at an output;
      at least one renderer having an input coupled to the subtag preprocessor output for receiving at least some of the information from the second file and the attributes, the at least one renderer for rendering the information from the second file and the attributes and rendering at an output the at least some of the information from the second file and at least some of the attributes into at least one page description file;
      a document assembler having an input coupled to the renderer output for receiving the at least one page description file, the document assembler for providing the page description file responsive to the at least one page description file.

12. The system of claim 11, wherein the type of page description file is selectable from a plurality of page description file types.

13. The system of claim 12, wherein the plurality of page description file types comprises Adobe Acrobat.

14. The system of claim 11, wherein:
   the at least one result comprises at least one additional non-HTML tag;
   the subtag preprocessor assigns at least one attribute by interpreting at least one of the at least one additional non-HTML tag.

* * * * *